United States Patent
Yuan

(10) Patent No.: US 9,755,982 B2
(45) Date of Patent: Sep. 5, 2017

(54) METHOD AND APPARATUS FOR CHECKING DATA FRAME LENGTH

(71) Applicant: ZTE Corporation, Shenzhen (CN)

(72) Inventor: Lei Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 144 days.

(21) Appl. No.: 14/652,261

(22) PCT Filed: Aug. 22, 2013

(86) PCT No.: PCT/CN2013/082084
§ 371 (c)(1),
(2) Date: Jun. 15, 2015

(87) PCT Pub. No.: WO2014/089989
PCT Pub. Date: Jun. 19, 2014

(65) Prior Publication Data
US 2015/0372932 A1  Dec. 24, 2015

(30) Foreign Application Priority Data
Dec. 14, 2012  (CN) .......................... 2012 1 0541223

(51) Int. Cl.
*H04L 12/805* (2013.01)
*H04Q 11/00* (2006.01)
(Continued)

(52) U.S. Cl.
CPC ................ *H04L 47/36* (2013.01); *H04L 1/00* (2013.01); *H04L 1/0091* (2013.01);
(Continued)

(58) Field of Classification Search
None
See application file for complete search history.

(56) References Cited

U.S. PATENT DOCUMENTS

2003/0137975 A1\*  7/2003  Song ..................... H04J 3/0652
370/353
2004/0205228 A1\* 10/2004  Rose ................... H04L 63/0236
709/236
(Continued)

FOREIGN PATENT DOCUMENTS

CN          1547358 A      11/2004
CN          1757220 A       4/2006
(Continued)

OTHER PUBLICATIONS

Wikipedia entry for Common logarithm, Nov. 12, 2012, whole document (downloaded from web.archive.org/web/20121112221058/http://en.wikipedia.org/wiki/Common_logarithm).\*

(Continued)

*Primary Examiner* — Hanh N Nguyen
*Assistant Examiner* — Jose L Perez
(74) *Attorney, Agent, or Firm* — Banner & Witcoff, Ltd.

(57) ABSTRACT

A method and apparatus for checking a data frame length relate to an Ethernet passive optical network in the communication field. The method includes: during reception of an Ethernet frame, when determining through analysis that a received Ethernet frame is a data frame, extracting frame length information and frame indication information in the data frame, and calculating a frame length mantissa according to the frame length information; writing the data frame into a small cache for storage according to the frame indication information, and counting write enable signals used for controlling writing of a data frame by using a base-N counter, so as to obtain a count value of the write enable signal; and comparing the frame length mantissa with the count value, and if a comparison result is consistent, then a data frame length being successfully checked, and writing (Continued)

---

101, during reception of an Ethernet frame, when it is determined through analysis that a received Ethernet frame is a data frame, frame length information and frame indication information therein are extracted, and a frame length mantissa is calculated according to the frame length information 102, the data frame is written into a small cache for storage according to the frame indication information, and write enable signals used for controlling writing of a data frame are counted by using a base-N counter, to obtain a count value of the write enable signals 103, the frame length mantissa and the count value are compared, and if a comparison result is consistent, then a data frame length is successfully checked, and the frame length information is written into the small cache for storage the frame length information into the small cache for storage.

10 Claims, 1 Drawing Sheet

(51) Int. Cl.
  *H04L 29/08* (2006.01)
  *H04L 1/00* (2006.01)
(52) U.S. Cl.
  CPC ..... *H04L 67/2852* (2013.01); *H04Q 11/0067* (2013.01); *H04L 1/0007* (2013.01); *H04Q 2011/0083* (2013.01)

(56) References Cited

U.S. PATENT DOCUMENTS

2012/0045203 A1* 2/2012 Haramaty ............... H04L 47/28
  398/45
2012/0239833 A1* 9/2012 Yoshimura ............... G06F 3/06
  710/52

FOREIGN PATENT DOCUMENTS

| CN | 102752674 A | 10/2012 |
| CN | 103023613 A | 4/2013 |
| WO | 2005104479 A | 11/2005 |

OTHER PUBLICATIONS

Wikipedia entry for Significand, Nov. 14, 2012, whole document (downloaded from web.archive.org/web/20121114225859/http://en.wikipedia.org/wiki/Significand).*
Supplementary European Search Report of EP13863521 dated Oct. 14, 2015.
Glen Kramer: "Shortened FEC Frames for 10GEPON: Is There Any Advantage?", IEEE Draft, Piscataway, NJ, vol. 802, Nov 7, 2006, 13 pages.
International Search Report of PCT/CN2013/082084, dated Nov. 28, 2013.

* cited by examiner 101, during reception of an Ethernet frame, when it is determined through analysis that a received Ethernet frame is a data frame, frame length information and frame indication information therein are extracted, and a frame length mantissa is calculated according to the frame length information 102, the data frame is written into a small cache for storage according to the frame indication information, and write enable signals used for controlling writing of a data frame are counted by using a base-N counter, to obtain a count value of the write enable signals 103, the frame length mantissa and the count value are compared, and if a comparison result is consistent, then a data frame length is successfully checked, and the frame length information is written into the small cache for storage

FIG. 1

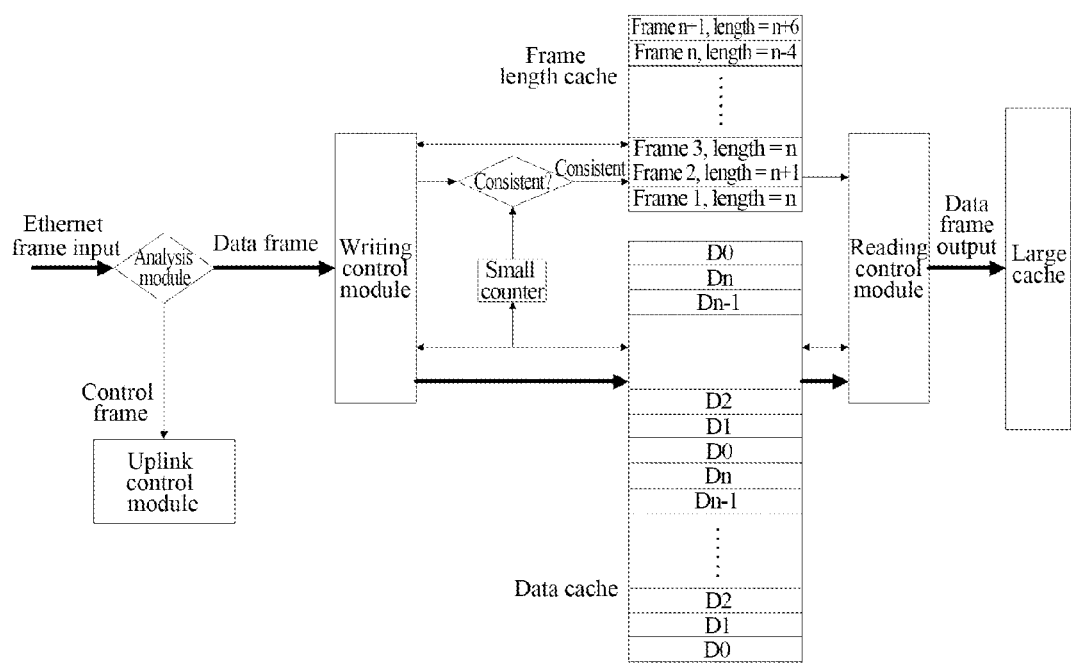

FIG. 2

METHOD AND APPARATUS FOR CHECKING DATA FRAME LENGTH

TECHNICAL FIELD

The present document relates to the Ethernet passive optical network (EPON) of the communication field, and in particular, to a method for checking a data frame length and a related apparatus.

BACKGROUND OF THE RELATED ART

With the fast growth of the voice, data and video services demand, the demand for the transmission bandwidth in the access layer is higher and higher. The access technology of "the last kilometer" represented by the xDSL is difficult to satisfy the user demand for the bandwidth; because the EPON, as one of the PON technologies, has the public characteristics, such as, the high bandwidth, the long distance coverage, the flexible networking, the passive intermediate network node, etc., it, applied to the broadband access network, can improve the network bandwidth and performance and reduce the maintenance cost, and is the next generation optical access technology favored by the major operator.

In the processes, such as, performing the ONU register, automatic finding, and distance measurement, etc., the EPON will all need to separate and analyze the MPCP and the data frame; in this way, the uplink framing module can run correctly. The analysis part mainly has two functions: first, to analyze the MPCP control frame, analyze the information of every field and send it to the control module; second, to extract the frame length information of the data frame and OAM frame, and send the frame length information and the frame indication information together with the frame content to the small cache. Therefore, the subordinate large cache extracts the information of the whole frame from the small cache each time according to the frame start information and the frame length information. Therefore, once the frame length information is caused to have mistakes for a certain reason, then it will cause that the big cache is unable to read the information of the whole frame during every reading out, and cause the link service to be unable to jump out from the dead loop, and unable to resume. So, how to correctly analyze the Ethernet frame and extract the frame length information directly influences whether the back-stage module could work normally and steadily. A solution is, while the back-stage cannot receive the normal data all the time, to tell the analysis module to reset the small cache and the later large cache and enable it to work again. Although the method can make it return to normal, the frame dropping will be very severe.

SUMMARY OF THE INVENTION

The objective of the embodiment of the present invention is to provide a method and apparatus for checking a data frame length, through checking the frame length information at the writing end of the small cache, it ensures that the frame length information written in the small cache is consistent with the frame length which is actually written, and guarantees that the link work stably and reliably.

According to one aspect of the embodiment of the present invention, a method for checking a data frame length is provided, comprising:

during reception of an Ethernet frame, when determining through analysis that a received Ethernet frame is a data frame, extracting frame length information and frame indication information in the data frame, and calculating a frame length mantissa according to the frame length information;

writing the data frame in a small cache for storage according to the frame indication information, and counting write enable signals used for controlling writing of a data frame by using a base-N counter, to obtain a count value of the write enable signals; and comparing the frame length mantissa with the count value, and if a comparison result is consistent, then a data frame length being successfully checked, and writing the frame length information into the small cache for storage.

Alternatively, the received Ethernet frame is analyzed to obtain frame type information, and it is judged whether the Ethernet frame is the data frame according to the frame type information.

Alternatively, the small cache comprises a frame length cache and a data cache, the frame length information is stored in the frame length cache, and the data frame is stored in the data cache.

Alternatively, modulo-N processing is performed on a frame length of the data frame according to the frame length information, to obtain the frame length mantissa.

Alternatively, according to the frame indication information, the base-N counter starts counting the write enable signals at the beginning of the data frame, and finishes counting the write enable signals at the end of the data frame, and obtains the count value.

Alternatively, the method further comprises:

when there is a data frame in the data cache, reading data with a corresponding length from the data cache according to the frame length information in the frame length cache, and storing the data in a large cache.

According to another aspect of the embodiment of the present invention, an apparatus for checking a data frame length is provided, comprising:

an analysis module, configured to: during reception of an Ethernet frame, when determining through analysis that a received Ethernet frame is a data frame, extract frame length information and frame indication information in the data frame;

a base-N counter, configured to: count write enable signals used for controlling writing of a data frame, to obtain a count value of the write enable signals;

a writing control module, configured to: write the data frame into a small cache according to the frame indication information, calculate a frame length mantissa according to the frame length information, and compare the frame length mantissa with the count value; and if a comparison result is consistent, then a data frame length being successfully checked, and write the frame length information into the small cache; and a small cache, configured to: store the frame length information and the data frame.

Alternatively, the writing control module comprises:

a frame length mantissa calculation submodule, configured to: perform a modulo-N processing on a frame length of the data frame according to the frame length information, to obtain the frame length mantissa.

Alternatively, the small cache is further configured as a frame length cache for storing the frame length information and a data cache for storing the data frame.

Alternatively, the apparatus further comprises:

a reading control module, configured to: when there is a data frame in the data cache, read data with a corresponding length from the data cache according to the frame length information in the frame length cache, and store the data in a large cache.

Compared with the related art, the beneficial effects of the embodiment of the present invention lie in that:

1, in the embodiment of the present invention, it can ensure that the frame length information written into the small cache is consistent with the frame length which is actually written into the small cache, and guarantee that the back-stage link work stably and reliably; and 2, in the embodiment of the present invention, it only needs to design one small counter, which is simple to realize and takes few resources.

BRIEF DESCRIPTION OF DRAWINGS

FIG. 1 is a principle block diagram of a method for checking a data frame length provided by an embodiment of the present invention;

FIG. 2 is a realization block diagram of checking a data frame length provided by an embodiment of the present invention.

PREFERRED EMBODIMENTS OF THE PRESENT INVENTION

The preferred embodiments of the present invention are described in detail with reference to the accompanying drawings hereinafter. It should be understood that, the embodiments illustrated hereinafter are used to describe and explain the patent document, rather than constituting an inappropriate limitation to the patent document.

In the embodiment of the present invention, a small counter is added at the input end of the cache, and the written frame data is counted, and it is compared with the frame length mantissa after one frame is written completely; if being identical, then it is explained that the length of the whole frame data written into the small cache and the written frame length information are consistent, thereby avoiding the occurrence of the situation that the whole frame information cannot be read each time when the large cache is read caused by an error occurred in the frame length information, the service link is unable to jump out of the dead loop and cannot be resumed, etc. The embodiment of the present invention is further illustrated in detail by combining FIG. 1 and FIG. 2 hereinafter.

FIG. 1 is a principle block diagram of a method for checking a data frame length provided by an embodiment of the present invention; as shown in FIG. 1, the following steps are included.

In step 101, during reception of an Ethernet frame, when it is determined through analysis that a received Ethernet frame is a data frame, frame length information and frame indication information therein are extracted, and a frame length mantissa is calculated according to the frame length information.

Specifically, when the Ethernet frame arrives, the received Ethernet frame is analyzed, to obtain the frame type information, and the MPCP control frame and the data frame are processed separately according to the frame type information. When it is determined that the Ethernet frame is the MPCP control frame, the field analysis is performed on the MPCP control frame, and the analysis information is sent to the uplink control module; when it is determined that the Ethernet frame is the data frame, the frame length information is extracted from the data frame and sent to the small cache control module, that is, the writing control module.

The small cache control module performs the modulo-N processing on the frame length of the data frame according to the frame length information, to obtain the frame length mantissa.

In step 102, the data frame is written into a small cache for storage according to the frame indication information, and write enable signals used for controlling writing of a data frame are counted by using a base-N counter, to obtain a count value of the write enable signals.

Specifically, for the small cache control module, according to the frame indication information, the base-N counter starts counting the write enable signals at the beginning of the data frame, and finishes counting the write enable signals at the end of the data frame, and obtains the count value. That is to say, the data frames are jointed according to the frame indication information and the bit width requirement of the small cache, to generate the data with the required bit width and generate the cache writing control sequence, and the data frame is written into the small cache. And, in the rewriting process, one small counter is used to count the write enable signals; and when a frame is started, it starts to count the write enable signals, until the frame completion signal arrives, and the counting is over.

In step 103, the frame length mantissa and the count value are compared, and if a comparison result is consistent, then a data frame length is successfully checked, and the frame length information is write into the small cache for storage.

Specifically, when the frame completion signal arrives, the frame length mantissa is compared with the small counter, to determine whether the two are consistent, and the comparison result is sent to the small cache control module. The small cache control module performs the subsequent operation according to the comparison result; if the comparison result is consistent, then it is illustrated that the frame length information is correct, then the frame length information is written into the small cache, and the remaining part of the data frame is written into the small cache; if the comparison result is inconsistent, then it is believed that the frame length information is incorrect, it is not written into the small cache, and the part of the data frame already written into the small cache is abandoned, and the control pointer is resumed to the location where the last frame is written.

The small cache includes a frame length cache and a data cache, the frame length information is stored in the frame length cache, and the data frame is stored in the data cache.

When there is a data frame in the data cache, data with a corresponding length can be read from the data cache according to the frame length information in the frame length cache, and the data are stored into a large cache. That is to say, when the frame length cache is not empty (at least one frame), the reading control module reads the frame length information from the frame length cache, and then reads the data with the corresponding length from the corresponding data cache according to the frame length information, and the frame starting and ending information is generated and sent to the back-stage large cache.

FIG. 2 is a realization block diagram of checking a data frame length provided by an embodiment of the present invention. As shown in FIG. 2, the apparatus includes the following modules:

an analysis module is configured to: during reception of an Ethernet frame, when it is determined through analysis that a received Ethernet frame is a data frame, extract frame length information and frame indication information in the data frame;

a base-N counter is configured to: count write enable signals used for controlling writing of a data frame, to obtain a count value of the write enable signals;

a writing control module is configured to: write the data frame into a small cache according to the frame indication information, calculate a frame length mantissa according to the frame length information, and compare the frame length mantissa with the count value; and if a comparison result is consistent, then a data frame length being successfully checked, and write the frame length information into the small cache; wherein, the writing control module uses its frame length mantissa calculation submodule to perform the modulo-N processing on the frame length of the data frame, to obtain the frame length mantissa; and a small cache is configured to: store the frame length information and the data frame.

A reading control module is configured to: when there is a data frame in the data cache, read data with a corresponding length from the data cache according to the frame length information in the frame length cache, and store the data in a large cache.

An uplink control module is configured to: when the analysis module determines that the Ethernet frame is the control frame, receive and process the control frame.

In the embodiment of the present invention, the write enable signals of the small cache are counted through designing one R-bit base-N small counter, wherein, $N=2^R$, and the counting result of the small counter is the data amount corresponding to the lower R-bit of the data frame. When one frame will be written into the small cache completely for checking the frame length, the last R-bit of the frame length can be directly used to compare with the count value of the small counter, of which the speed is high and which does not take up the resources. Here, the bigger the bit width of the small counter is, the higher the reliability is.

In the present embodiment, the small cache is further configured as the frame length cache for storing the frame length information and the data cache for storing the data frame. The base-N counter is designed to be a small counter of which the bit width is 2-bit. The count value is changed to 0 each time when it is counted to 4, and the residue obtained from frame length modulo 4 is taken as R, and R is also the bit width of 2-bit.

In step one, when the Ethernet network frame arrives, the frame type is judged; if it is the MPCP control frame, then it is analyzed, and the analysis information of every field is sent to the uplink control module; if the received one is the data frame, then the frame length information and the frame indication information of the data frame is extracted and sent to the writing control module.

In step two, the writing control module joints the data frames according to the frame indication information and the bit width requirement of the data cache, to generate the data with the required bit width and generate the cache writing control sequence, and the data frame is written into the small cache.

In step three, a small counter is used to count the write enable signals; before a frame is written, the initialization value of the small counter is 0; in the writing process, the small counter starts to count the write enable signals until a frame is over; and the small counter stops the counting.

In step four, when the frame completion signal arrives, the small counter finishes the counting and the residue R obtained from the frame length modulo 4 is compared with the count value of the small counter. If the two are equal, then the data length written into the data cache is consistent with the frame length; if the two are unequal, then they are believed to be inconsistent, and the comparison result is sent to the writing control module, waiting for its judgment.

In step five, the writing control module performs the subsequent operation according to the comparison result. If the comparison result is consistent, then it is illustrated that the frame length information is correct, then the frame length information is written into the frame length cache, and the unwritten part of the data frame is written into the data cache; if the comparison result is inconsistent, then it is believed that the frame length information is incorrect, it is not written into the frame length cache, and the frame data already written into the data cache are abandoned, and the control pointer is resumed to the location where the last frame is written.

In step six, when the frame length cache is not empty (at least one frame), the reading control module reads the frame length information from the frame length cache, and then reads the data with the corresponding length from the corresponding data cache according to the frame length information, and the frame starting and ending information is generated and sent to the back-stage large cache.

Although the above text describes the embodiment of present invention in detail, the embodiment of present invention is not limited here. Those skilled in the art can make various modifications according to the principles of the embodiment of present invention. Therefore, and all the modifications made according to the principles of the embodiment of present invention should be understood to be included in the protection scope of the embodiment of present invention.

INDUSTRIAL APPLICABILITY 1, in the embodiment of the present invention, it can ensure that the frame length information written into the small cache is consistent with the frame length which is actually written into the small cache, and guarantee that the back-stage link work stably and reliably; and 2, in the embodiment of the present invention, it only needs to design one small counter, which is simple to realize and takes few resources.

What I claim is:

1. A method for checking a data frame length, comprising:
during reception of an Ethernet frame, determining whether the Ethernet frame is a control frame or a data frame;
upon determining that the Ethernet frame is a data frame, extracting frame length information and frame indication information in the data frame;
calculating a frame length mantissa according to the frame length information wherein the frame length mantissa is a residue obtained by performing modulo-N processing on a frame length of the data frame, wherein N is a positive integer;
writing the data frame into a small cache for storage according to the frame indication information, and counting write enable signals used for controlling writing of a data frame by using a base-N counter, to obtain a count value of the write enable signals;
comparing the frame length mantissa with the count value; and
upon a comparison result which indicates the frame length mantissa is consistent with the count value, writing the frame length information into the small cache for storage.

2. The method according to claim 1, wherein the received Ethernet frame is analyzed to obtain frame type information, and whether the Ethernet frame is the data frame is judged according to the frame type information.

3. The method according to claim 1, wherein the small cache comprises a frame length cache and a data cache, and the frame length information is stored in the frame length cache, and the data frame is stored in the data cache.

4. The method according to claim 3, wherein modulo-N processing is performed on a frame length of the data frame according to the frame length information, to obtain the frame length mantissa.

5. The method according to claim 4, wherein according to the frame indication information, the base-N counter starts counting the write enable signals at the beginning of the data frame, and finishes counting the write enable signals at the end of the data frame, and obtains a count value.

6. The method according to claim 3, further comprising:
when the frame length cache is not empty, reading the frame length information from the frame length cache, and reading data from the data cache according to the read frame length information, and storing the data into a large cache.

7. An apparatus for checking a data frame length, comprising:
an analysis module, which stores in a non-transitory computer readable storage medium thereof computer program code that causes a processor thereof to:
during reception of an Ethernet frame, determine whether the Ethernet frame is a control frame or a data frame;
upon determining that the Ethernet frame is a data frame, extract frame length information and frame indication information in the data frame;
a base-N counter, which stores in a non-transitory computer readable storage medium thereof computer program code that causes a processor thereof to:
count write enable signals for controlling writing of a data frame, to obtain a count value of the write enable signals;
a writing control module, which stores in a non-transitory computer readable storage medium thereof computer program code that causes a processor thereof to:
write the data frame into a small cache according to the frame indication information;
calculate a frame length mantissa according to the frame length information wherein the frame length mantissa is a residue obtained by performing modulo-N processing on a frame length of the data frame, wherein N is a positive integer;
compare the frame length mantissa with the count value; and
upon a comparison result which indicates the frame length mantissa is consistent with the count value, write the frame length information into the small cache; and
the small cache, which stores in a non-transitory computer readable storage medium thereof computer program code that causes a processor thereof to: store the frame length information and the data frame.

8. The apparatus according to claim 7, wherein the writing control module comprises:
a frame length mantissa calculation submodule, which stores in a non-transitory computer readable storage medium thereof computer program code that causes a processor thereof to: perform modulo-N processing on a frame length of the data frame according to the frame length information, to obtain the frame length mantissa.

9. The apparatus according to claim 7, wherein the small cache is further configured as a frame length cache for storing the frame length information and a data cache for storing the data frame.

10. The apparatus according to claim 9, further comprising:
a reading control module, which stores in a non-transitory computer readable storage medium thereof computer program code that causes a processor thereof to: when the frame length cache is not empty, read the frame length information from the frame length cache, and read data from the data cache according to the read frame length information, and store the data into a large cache.

* * * * *